Patented Jan. 28, 1936

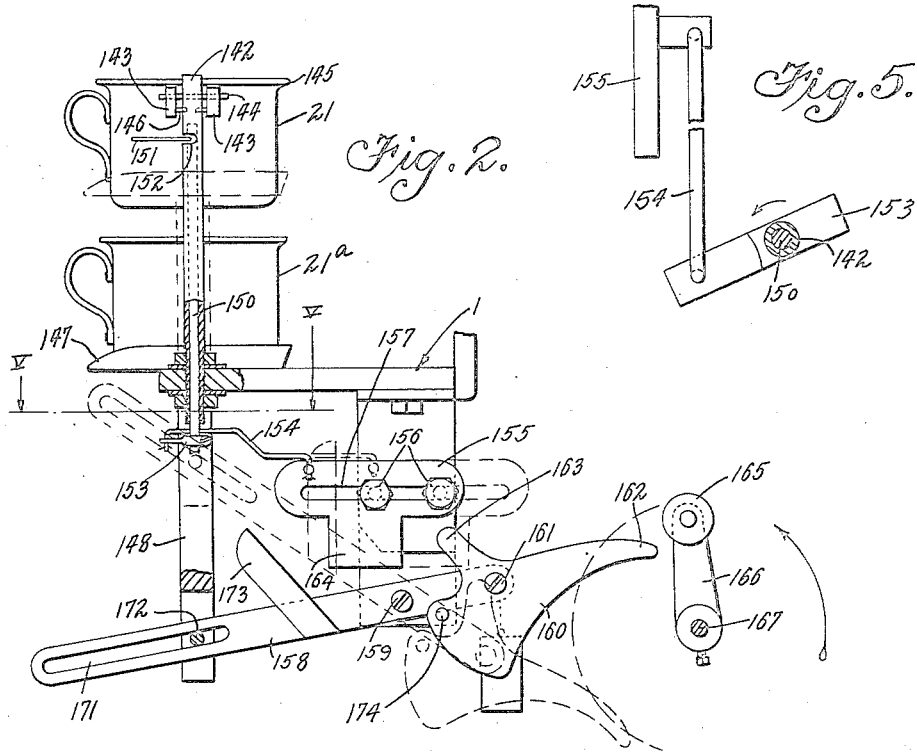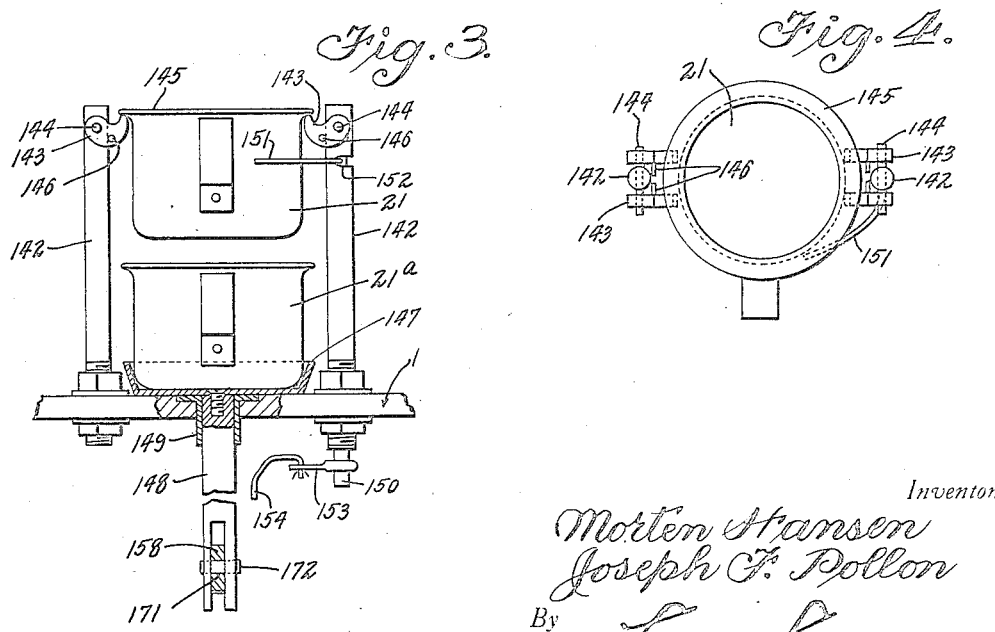

2,029,167

UNITED STATES PATENT OFFICE 2,029,167

CUP MOVING MECHANISM

Morten Hansen, Los Angeles, and Joseph F. Pollon, Glendale, Calif.; said Pollon assignor to William G. Young, Los Angeles, Calif.

Original application June 24, 1932, Serial No. 619,100. Divided and this application July 25, 1933, Serial No. 682,082

4 Claims. (Cl. 146—2)

This invention relates to automatic cup moving mechanisms and has as an object the provision of means for normally supporting a pair of cups in stationary positions, one above the other, and for automatically elevating the lower cup into the position previously occupied by the upper cup in response to removal of the upper cup.

The invention is particularly useful in connection with automatic egg breaking machines and is disclosed in a copending application of William G. Young, Morten Hansen and Joseph F. Pollon, Serial No. 619,100, filed June 24th, 1932, entitled "Egg breaking machine", now matured into a patent, No. 1,988,030 of which this application is a division.

In the operation of an automatic egg breaking machine, despite the exercise of care in selecting eggs, defective eggs are occasionally fed to the machine and, if the contents of all the eggs were delivered initially to large containers, one bad egg might contaminate a relatively large quantity of good egg meat. To avoid the possibility of such loss, in accordance with the present invention, we initially collect the egg meat in relatively small cups, the contents of which are inspected by an operator, and emptied into separate large containers containing good egg meat, or rejected, according to the quality of the contents of each cup. Since an automatic egg breaking machine delivers egg meat almost continuously, it is necessary to immediately replace each filled cup with an empty cup as the filled cup is removed for emptying. The present invention is intended to greatly simplify the work of the operator by automatically shifting an empty cup into position to be filled as a full cup is removed.

In the drawings:

Figure 2 is a side elevation partly in section of the cup supporting and moving mechanism;

Figure 3 is a fragmental front elevation view of a portion of the cup lifting and holding mechanism;

Figure 4 is a plan view of the cup supporting mechanism shown in elevation in Figure 3; and Figure 5 is a horizontal detail view in the plane V—V of Figure 2, showing the arrangement of connecting links.

Figure 1:
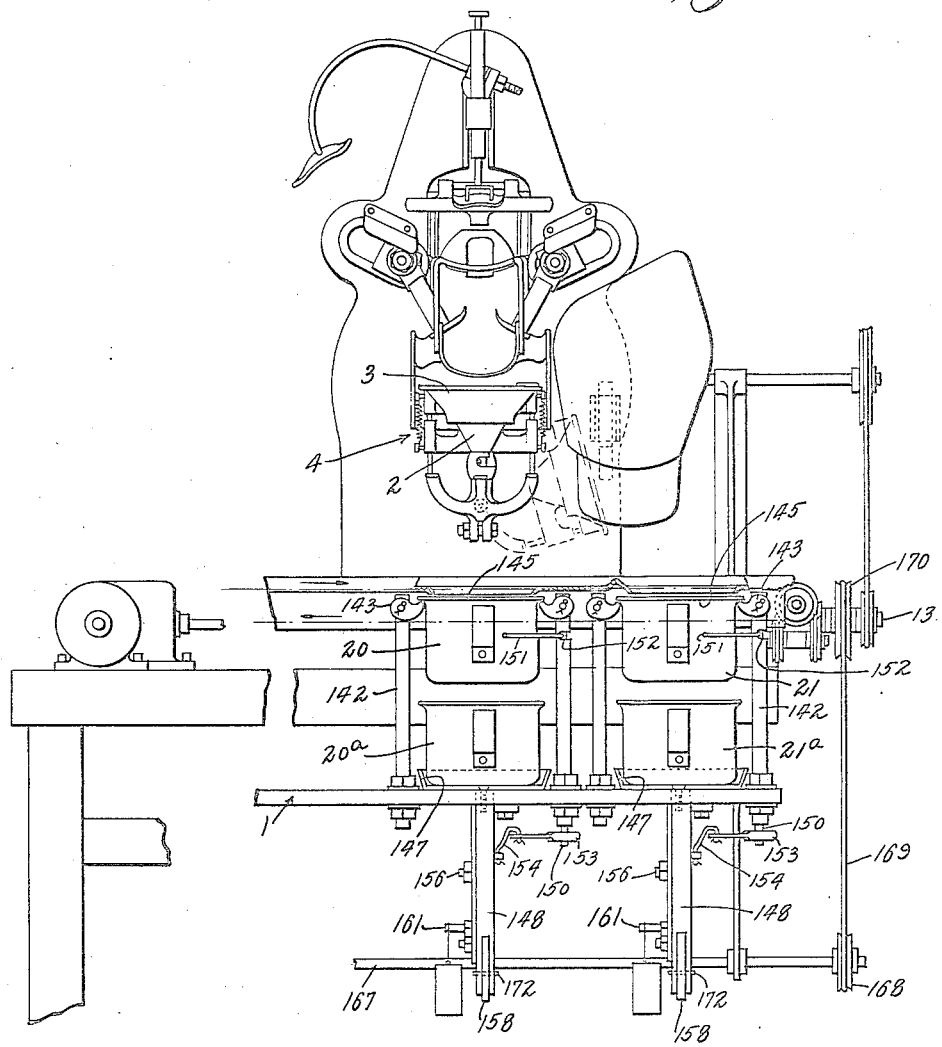
Figure 1 is a front elevation of our cup supporting and shifting mechanism, together with a portion of an egg breaking machine, with which it may be used.

In the operation of the egg breaking machine shown in Figure 1, eggs are periodically broken and opened and the egg contents collected in a tiltable white and yolk separating receptacle 4, comprising a yolk cup 2 having a separable rim 3. The machine is so timed that following the discharge of the white and yolk of an egg into a receptacle 4 the rim 3 is lifted clear of the yolk cup 2 to permit the egg white to drain into a cup 20 positioned thereunder. The rim 3 is then returned to normal position against the yolk cup 2 and the entire receptacle 4 tilted, as shown in dotted lines in Figure 1, to discharge the yolk into another cup 21.

Since in normal operation the egg breaking mechanism runs continually, it is necessary that the filled cups 20 and 21, as they are removed, be replaced immediately with empty cups. To this end, auxiliary cups 20a and 21a are provided immediately under the cups 20 and 21 and the following mechanism is provided for moving and retaining these cups in desired position.

To support each cup, a pair of pillars 142 extend upwardly from the frame 1 and are provided at their upper ends with pivoted dogs 143. As shown in Figures 3 and 4, there are two dogs 143 pivoted to each pillar 142 by pivot pins 144. The inner ends of the dogs extend inwardly to engage the rim 145 of the cup. To prevent downward rotation of the inner ends of the dogs 143, each dog is provided with a pin 146 which engages with its supporting pillar 142.

The lowermost cups 20a and 21a are positioned immediately below the upper cups 20 and 21 respectively and rest in nests 147, which normally lie upon the frame 1 but are secured to the upper ends of columns 148 (Figure 3) which pass down through bushings 149 in the frame 1. When the upper cup 20 is removed, the lower cup 20a is elevated into the position formerly occupied by the removed cup by a mechanism that can be most readily described by explaining its operation.

One of the pillars 142 associated with each cup is made hollow and contains therewithin a shaft 150 (Figures 2 and 3). Shaft 150 has secured thereto an arm 151 which extends through a slot 152 in the pillar 142 out in front of the upper cup, this arm being preferably curved as shown in Figure 4. When the upper cup is filled, the operator removes it by pulling it straight forwardly off the dogs 143. This moves the arm 151 forwardly and rotates the shaft 150. Referring now to Figures 2 and 3, the rotation of shaft 150 rotates a crank 153 secured on the lower end thereof below the end of pillar 142, and, through a link 154, shifts a lock plate 155 forwardly (from the position shown in dotted lines into the position shown in full lines, in Figure 2). This lock plate 155 is slidably mounted upon the frame 1 by means of a pair of bolts 156 which are secured to frame 1 and engage with a horizontal slot 157 in plate 155.

Pivoted to the frame 1 by a pivot 159 at a point below the lock plate 155 is a lever 158. The rear end of lever 158 carries a plate 160, which is pivoted thereto by a pivot 161. Plate 160 comprises a rearwardly projecting arm 162 and a forwardly projecting arm 163. The forwardly projecting arm 163 normally contacts with the lower edge of a projection 164 on lock plate 155, which maintains the rearwardly projecting arm 162 just out of engagement with a roller 165 pivotally mounted on the end of a crank 166 on a shaft 168. Shaft 167 is constantly driven in a counterclockwise direction through a pulley 168 and belt 169 from a pulley 170 on a driving shaft 13. The forward end of lever arm 158 contains a slot 171 which engages with a pin 172 in the lower end of the shaft 148, this lower end of shaft 148 being bifurcated as shown in Figure 3 to receive lever arm 158. A restoring arm 173 is secured to lever arm 158 for a purpose to be described.

Assuming that the mechanism is in normal position, the removal of the upper cup 21 by the operator moves the arm 151 forwardly, rotating shaft 150 and crank 153 as described and shifting the lock plate 155 forwardly through link 154. The apparatus is then in the position shown in full lines in Figure 2, and it will be observed that the forward movement of the lock plate 155 has moved the lower projecting portion 164 of this plate out of engagement with the forwardly projecting arm 163 on plate 160. This permits the plate 160 to rotate in clockwise direction about its pivot 161 so that the rearwardly projecting arm 162 is moved into the path of roller 165 mounted on the end of the constantly revolving crank 166. Therefore, on its next revolution, the roller 165 engages with the upper side of arm 162 and forces that arm down into the position shown in dotted lines in Figure 2. The clockwise rotation of the plate 160 with respect to the lever arm 158 is limited by a pin 174 which engages with the under side of lever arm 158. Therefore, when the plate 160 is carried downwardly from the revolution of roller 165, the rear end of lever arm 158 is moved downwardly with member 160 and the forward end of lever 158 is swung upwardly into the position shown in dotted lines in Figure 2. This upward movement of the forward end of the lever 158 carries the shaft 148 upwardly therewith, which lifts the tray 147 and the cup 21a upwardly past dogs 143, the inner ends of these dogs rotating upwardly to permit the rim of the cup 21a to move therepast, and thereafter falling back into their normal position to engage with the under side of the rim of the cup and support it when the shaft 148 again descends; shaft 148 descends by its own weight when the rearwardly projecting arm 162 on member 160 is released by continued movement of the revolving roller 165. When the forward end of lever arm 158 moved upwardly into its uppermost position, the projecting arm 173 engaged with the forward end of member 155 and restored the latter to its normal position shown in dotted lines in Figure 2. Therefore, when the arm 162 is released by roller 165 and moves upwardly, the projection 163 on plate 160 engages with the projection 164 on member 155, causing plate 160 to rotate in a counterclockwise direction about its pivot 161 until arm 162 is clear of the path of the roller 165. Rearward movement of plate 155 also rotates the shaft 150, through the link 154 and crank 153, into normal position in which the arm 151 lies in front of the cup newly moved into upper position.

It will be apparent from the foregoing description that the removal of an upper cup by the operator immediately sets into operation a mechanism which lifts the lower cup into upper position to receive the white or yolk of eggs as the case may be. The operator after emptying the cup previously removed reinserts it in lowermost position upon nest 147 and when the upper cup is again removed, this cup will be moved into position to be filled.

We claim:

1. In a machine of the type described, a cup, means for supporting said cup in a predetermined position, a second cup, second means for independently supporting said second cup directly below said first cup, and means actuated in response to removal of said first cup from said predetermined position for lifting said second cup vertically into said predetermined position and into supported relation with said first supporting means.

2. In a machine of the type described, a cup, a second cup, each of said cups having an outwardly extending flange, means supporting said first cup in a predetermined position comprising elements positioned to engage with the flange on said cup, and thereby support it, said elements being movable to permit the flange of a cup to rise upwardly therepast but locking to prevent downward movement of said cup, means for supporting said second cup below said first cup, and means actuated in response to removal of said first cup from said flange-engaging elements for lifting said second cup up past said flange-engaging elements whereby said second cup is left supported on said elements.

3. In a machine of the type described, a cup having an outwardly extending flange thereon, means for supporting said cup in a predetermined position comprising elements positioned to engage with the flange on said cup, said elements being movable to permit the flange of a cup to rise upwardly therepast, a second cup also having an outwardly extending flange, means for supporting said second cup below said first cup, an arm normally extending in front of said first cup, cup-lifting means actuated by forward movement of said arm for lifting said second cup into engagement with said supporting elements, and means actuated by said cup-lifting mechanism for restoring said arm to normal position in front of said second cup.

4. A device as described in claim 3, in which the means for lifting said second cup comprises a tray upon which said cup rests freely.

MORTEN HANSEN.
JOSEPH F. POLLON.